UNITED STATES PATENT OFFICE.

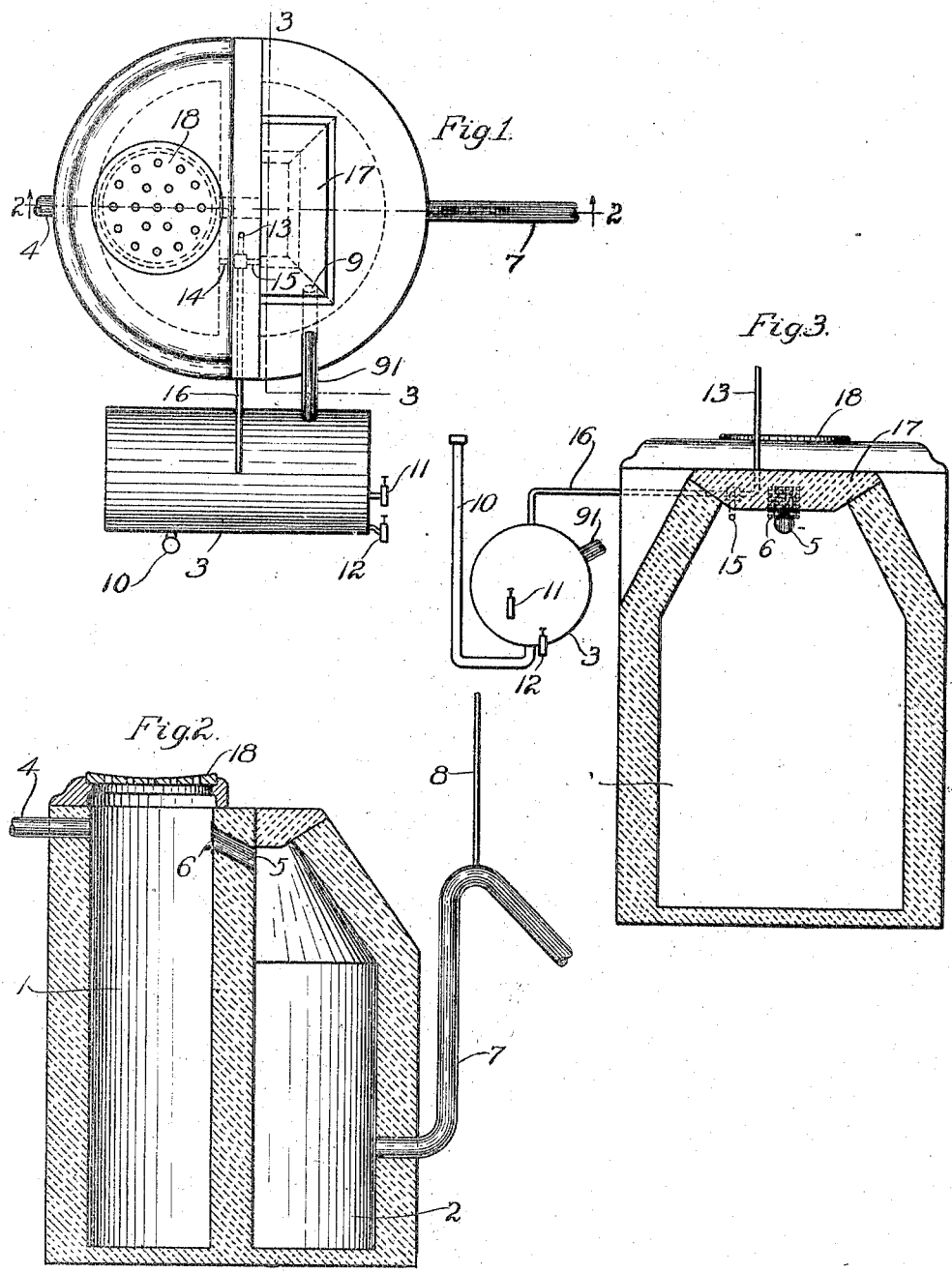

PAUL HANNAGAN, OF LAWRENCE, MASSACHUSETTS.

SAND, OIL, GASOLENE, AND WATER SEPARATOR.

1,249,749.　　　　Specification of Letters Patent.　　Patented Dec. 11, 1917.

Application filed July 12, 1916. Serial No. 108,931.

*To all whom it may concern:*

Be it known that I, PAUL HANNAGAN, a citizen of the United States, residing at Lawrence, in the county of Essex, State of Massachusetts, have invented a certain new and useful Improvement in Sand, Oil, Gasolene, and Water Separators, of which the following is a specification, reference being had therein to the accompanying drawings.

The invention consists in an improved separator by means of which sand, and oil and gasolene (one or both as the case may be), may be separated from water, as for instance in the case of the drainage of garages, and drainage or discharges of steam plants, manufacturing plants, etc.

A separator embodying the invention comprises a settling chamber which receives the flow of drainage or other liquid requiring separation, and within which opportunity is afforded for sand and other material capable of settling from the liquid contents of the said chamber to do so; a separating chamber to which all of the liquid contents pass from the settling chamber; a collecting chamber or receiver for the separated oil, gasolene, or oil and gasolene; and an outlet for the water. Preferably, though not necessarily in all cases, the said outlet leads from the separating chamber at a point elevated above the bottom of said chamber to permit of some accumulation of sediment without the outlet becoming clogged. When the separator is used for separating gasolene from drainage or the like the three chambers are vented to permit of the escape of vapor.

An illustrative embodiment of the invention is shown in the drawings, in which latter,—

Figure 1 is a plan view of a separator containing the said embodiment.

Fig. 2 is a view of the said separator in vertical section in the plane of the dotted line 2, 2, of Fig. 1.

Fig. 3 is a view in vertical section in the plane of the dotted line 3, 3, Fig. 1.

Having reference to the drawings,—

The settling chamber is marked 1, the separating chamber being marked 2, and the collecting chamber or receiver being marked 3. The inflow of the drainage or other liquid requiring to be separated may take place through an inlet-pipe 4, which enters the settling chamber at or near the top thereof. The settling chamber is of a capacity and depth proportioned to the volume and rate of flow of the said liquid, and suitable to afford opportunity for sand and other solid matters carried in by the liquid or held in suspension therein, to settle and accumulate at the bottom of such chamber. The settling chamber has no direct communication with the sewer. Consequently, sand and the said solid matters cannot wash or be carried into the sewer by rush of liquid through such chamber. It communicates through a passage 5 with the separating chamber, the said passage being screened at its entrance, as at 6, to prevent floating litter from being carried through from the settling chamber into the separating chamber. All the liquid which enters the settling chamber issues therefrom through the passage 5. Such passage inclines downward from its entrance toward its point of discharge within the separating chamber so as to insure that all the oil or gasolene shall flow through into the separating chamber. The outlet for water or other heavy liquid from the separating chamber is constituted by a pipe 7, the mouth of which is located in the lower portion of the separating chamber. The said pipe extends upward to a height corresponding with the intended level of the top surface of the contents of the separating chamber, and then is bent downward, the said pipe having at its bend a vent 8 to prevent siphoning, and its extension being suitably connected with a sewer. An outlet 9 for the oil or gasolene, or mixed oil and gasolene, floating at the top of the water contained in the separating chamber communicates through a pipe 91 with the collecting chamber or receiver 3. The latter is furnished with suitable provisions for drawing off its contents, as for instance a convenient pump-connection 10 for a pump by means of which the oil or gasolene, or combined oil and gasolene, may be delivered at the required point, a faucet 11 by means of which the oil or gasolene, or mixed oil and gasolene, may be drawn off, and a faucet 12 by means of which any water which may have entered the collecting chamber or receiver may separately be drawn off.

A vent-pipe 13 communicating with the atmosphere connects by branches 14, 15, and 16 with the settling chamber, separating chamber, and collecting chamber or receiver, respectively.

The drawings show the settling chamber and separating chamber embodied in a single structure, which may be of masonry or of metal or other approved material, while the collecting chamber or receiver in this instance is indicated as made of metal. A masonry structure containing the settling and separating chambers is indicated in the drawings, the top of the separating chamber being indicated as closed by a concrete block 17, while the top of the settling chamber is covered over and provided with a man-hole cover 18 which is removable to facilitate the cleaning-out of such chamber, although other suitable provision for closing the two chambers, with proper readiness of access to the interiors thereof, may be employed in practice. A separator such as has been described is designed to be sunk or otherwise located beneath the floor of a garage or manufacturing establishment, although this is not material to the invention.

The manhole cover 18 is or may be formed with openings, as shown, and set flush with or slightly below the floor of the garage in connection with which it is employed, or of the "wash stand" of such garage, so that the waste water, oil, etc., may enter directly through said openings.

The distance of the inner end of pipe 7 up from the bottom of the separating chamber may vary according to the amount of sediment or deposit which it is deemed advisable to permit to accumulate at the bottom of such chamber. By having the said inner end part way up from the bottom I am enabled to cause the liquid to flow from the exterior directly into the separating chamber, in case it is desired thus to operate.

The invention has been designed with especial reference to preventing sewer explosions caused by gasolene such as have occurred recently with great damage and loss in various cities of the United States.

When the separator is sunk or otherwise located beneath the floor of a garage or manufacturing establishment, or below the surface of the earth, a suitable opening will be left in connection with the receiver, or at least with the end thereof to which the faucets 11 and 12 are applied, to afford access to the said faucets.

What is claimed as the invention is,—

1. A separator comprising a settling chamber which receives the flow of liquid requiring separation and within which sand and other heavy material is permitted to settle, a separating chamber distinct from said settling chamber and to which all of the liquid contents of the settling chamber pass from the settling chamber at a level above the bottom of the latter, a collecting chamber or receiver receiving the separated oil, gasolene, or oil and gasolene, or the like, from the separating chamber, and an outlet from the separating chamber for the water.

2. A separator comprising a settling chamber which receives the flow of liquid requiring separation and within which sand and other heavy material is permitted to settle, a separating chamber distinct from said settling chamber and to which all of the liquid contents of the settling chamber pass from the settling chamber at a level above the bottom of the latter, a collecting chamber or receiver receiving the separated oil, gasolene, or oil and gasolene, or the like, from the separating chamber, and an outlet from the separating chamber for the water, all of said chambers vented to the atmosphere.

In testimony whereof I affix my signature in presence of two witnesses.

PAUL HANNAGAN.

Witnesses:
CHAS. F. RANDALL,
ELLEN O. SPRING.

Copies of this patent may be obtained for five cents each, by addressing the "Commissioner of Patents, Washington, D. C."